United States Patent [19]

Giry et al.

[11] Patent Number: 5,675,112
[45] Date of Patent: Oct. 7, 1997

[54] AIMING DEVICE FOR WEAPON AND FITTED-OUT WEAPON

[75] Inventors: Philippe Giry, Bois-Colombes; Claude Michel, Asnieres, both of France

[73] Assignee: Thomson-CSF, Paris, France

[21] Appl. No.: 418,291

[22] Filed: Apr. 7, 1995

[30] Foreign Application Priority Data

Apr. 12, 1994 [FR] France .................. 94 04300

[51] Int. Cl.$^6$ ........................ F41G 3/00
[52] U.S. Cl. ............ 89/41.06; 89/41.17; 89/41.05; 33/237
[58] Field of Search ............ 89/41.17, 41.19, 89/41.22, 41.05, 41.06; 33/237

[56] References Cited

U.S. PATENT DOCUMENTS

| | | | |
|---|---|---|---|
| 3,891,323 | 6/1975 | Ryan et al. | 89/41.06 |
| 4,227,261 | 10/1980 | Robertsson | 89/41.06 |
| 4,394,831 | 7/1983 | Egli et al. | 89/41.19 |
| 4,396,945 | 8/1983 | DiMatteo et al. | 358/107 |
| 4,418,361 | 11/1983 | Bagnall-Wild et al. | 89/41.05 |
| 4,652,917 | 3/1987 | Miller | 358/107 |
| 4,786,966 | 11/1988 | Hanson et al. | 358/108 |
| 4,870,290 | 9/1989 | Deck | 89/41.06 |
| 4,956,794 | 9/1990 | Zeevi et al. | 364/559 |
| 5,227,985 | 7/1993 | DeMenthon | 364/559 |

FOREIGN PATENT DOCUMENTS

| | | | |
|---|---|---|---|
| 0 209 411 | 1/1987 | European Pat. Off. . | |
| 2436169 | 2/1976 | Germany | 89/41.06 |
| 1203976 | 9/1970 | United Kingdom | 89/41.06 |
| 2143948 | 2/1985 | United Kingdom | 89/41.19 |
| 2 234 877 | 2/1991 | United Kingdom . | |

*Primary Examiner*—Stephen M. Johnson
*Attorney, Agent, or Firm*—Oblon, Spivak, McClelland, Maier & Neustadt, P.C.

[57] ABSTRACT

A device for the localizing and restoring of a line of fire of a weapon carried by a shooter equipped with a helmet, the device comprising two cameras, a first camera and a second camera, each having an objective and at least one sensor sensitive to light radiation, the first camera being mounted on the helmet and the second camera being mounted on the weapon, a computer receiving digitized information from each of the cameras and, on the basis of this digitized information, computing and controlling a display system to bring about the appearance thereon of a symbology providing a real-time depiction of the axis of fire of the weapon, wherein at least three distinctive optical reference marks in the range of sensitivity of the sensor and/or of the sensors are distributed between the weapon and the helmet and wherein, in the firing positions, the reference marks of the helmet are in the fields of the camera of the weapon and the reference marks of the weapon are in the fields of the camera of the helmet.

24 Claims, 5 Drawing Sheets

FIG.3a
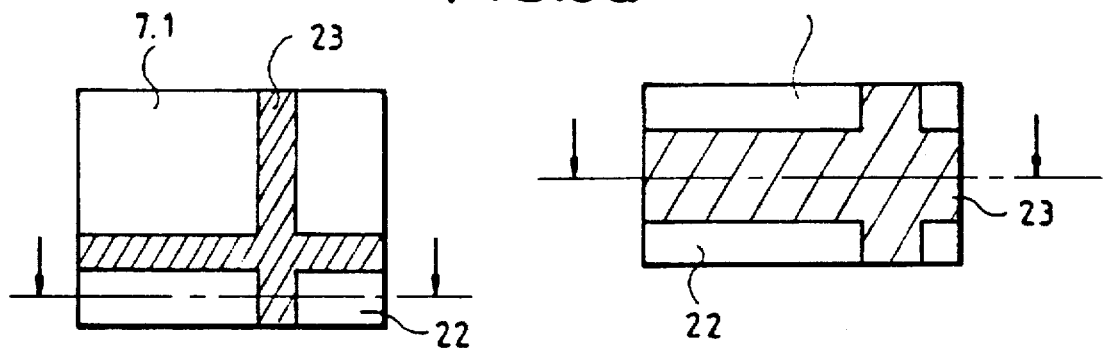
FIG.3b
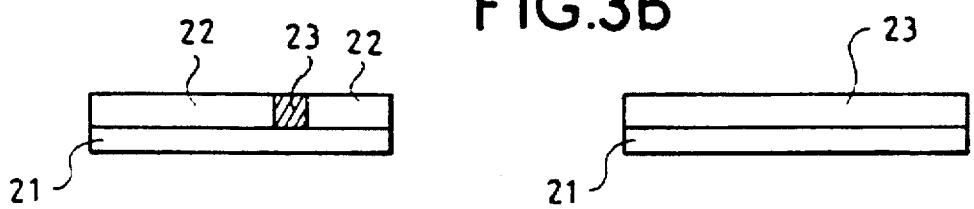
FIG.3
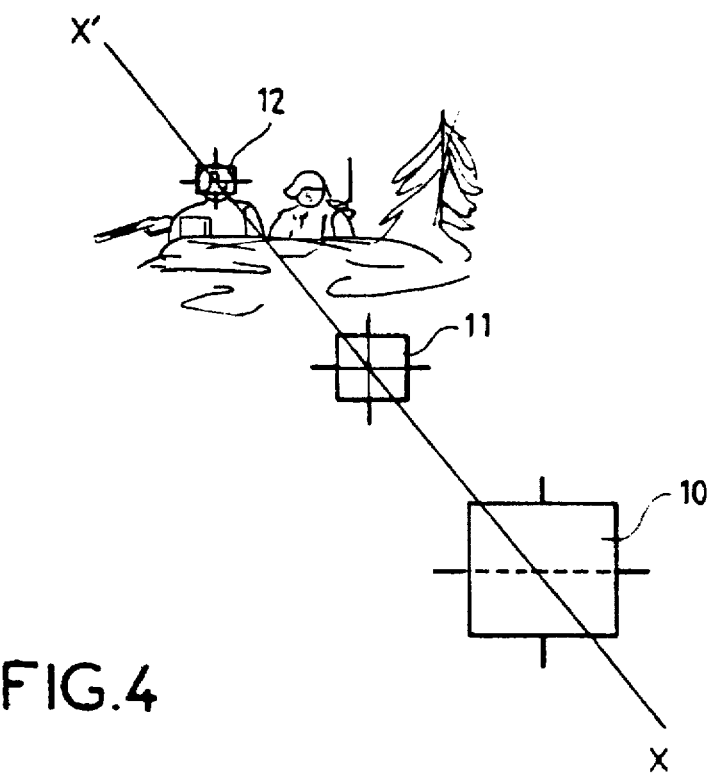
FIG.4

AIMING DEVICE FOR WEAPON AND FITTED-OUT WEAPON

BACKGROUND OF THE INVENTION

1. Field of the Invention

The invention relates to the field of aiming devices for individual weapons of the type wherein a collimated reticule or haircross has to be made to coincide with the target aimed at.

Conventionally, the haircross can be seen through an eyepiece or ocular device that is more or less directly linked to the weapon. Thus, on a rifle, the reticule and the eyepiece are directly mounted on the barrel of the rifle and the shooter needs to carry the eyepiece and hence the rifle in the line of aim.

This way of aiming is detrimental to firing speed and is therefore inconvenient for use with the protective equipment with which combatants are now provided. Military specialists are now envisaging the wearing by combatants of helmets fitted out in particular with wide-field day-and-night cameras and display systems in the form of glasses or helmet visors.

These helmet display systems enable wide-field monocular or binocular vision enabling the wearer to see view not only the image given by the helmet camera but also symbolic graphic information generated by digital systems also worn by the combatant and linked to him or her by means of a link. These means enable the combatant to have a view of the exterior by day as well as by night, this view being possibly associated or not associated with computer-generated graphic data. They enable him or her to have this view despite the protective equipment that he wears on his or her eyes to protect himself or herself against chemical or attack by radiation.

The conventional aiming means using eyepieces and reticules may therefore be replaced by other means.

2. Description of the Prior Art

A first known means consists in placing a continuous laser on the weapon and in its axis, the ray of this laser being distinguished by the camera and being therefore represented in the visual system of the helmet at the same time as the background image. When the laser ray has been placed on the target, the combatant can then shoot with precision. This device has the advantage of being based to a great extent on intuition (as when aiming a jet of water) but has the drawback of being active, namely highly detectable by the adversary in further giving him or her the possibility (with a minimum amount of equipment) of locating and shooting his or her attacker before coming under threat.

In a second known means, the weapon is also provided (in addition to the helmet) with a camera placed in the axis of the weapon. The localizing of the axis of the camera of the weapon (and hence of the weapon) with reference to the axis of the helmet camera (and hence of the helmet) is obtained by the correlation of the images of the two cameras viewing at least a part of the scenery in common. Once this relative position is computed, a reticule presenting an axis of the weapon appropriately placed in relation to the view of the helmet camera is presented on the visual display system of the camera. The firing is then done under conditions similar to those of the previous case but the device is then entirely passive. The drawbacks of this approach lie in the digital processing capacities needed for the correlation of the images as well as the need to make a transfer at high bit rate, between the weapon and the helmet, of digital image data in order to make the correlation at a position. Finally, the correlation between the image parts common to the two cameras is not always done reliably in certain scenic configurations.

The present invention seeks to obtain a passive aiming device for a weapon carried by a shooter equipped with a helmet visual system that requires only a low computing capacity and low transfer rates between the weapon, the helmet and the computer. It also seeks to obtain an aiming device that improves the precision with which the firing axis is restored. Finally it relates to an aiming system that depicts the firing axis in the display system of the helmet. Indeed, since the axis of the weapon is not necessarily aligned with the view of the carrier of the weapon, the aiming direction of the weapon can no longer be depicted simply by a point and it becomes necessary to depict the line of fire of the weapon.

Like the second device described in the prior art, the present invention has two cameras, one on the helmet and the other on the rifle.

Each of these cameras has a wide-field objective enabling the formation of an optical image.

The camera placed on the weapon has a position and orientation such that when the weapon is in the firing position, at least one distinctive optical reference mark, physically linked to the helmet, is in the field of the camera of the weapon. The camera of the helmet has a position and orientation such that, when the shooter looks ahead, having his or her weapon in the firing position, at least two distinctive optical reference marks physically linked to the weapon are in a field of the camera of the helmet.

When the working of the device according to the invention has been described, it will be understood that the operation has a certain degree of symmetry. Thus, the principle of the operation remains the same with two optical reference marks on the helmet and only one on the rifle.

The optical reference marks of the helmet or of the weapon may be active transmitters having a shape and a brightness that can be easily identified by the processing of optical images of each of the cameras. They will preferably be reference marks working by reflection in the daytime, for example catadiopters and by emission at night. They could also be, for this purpose, surfaces of transflexive materials having a predetermined succession of known contrasts. In reflexive mode for daytime operation, they could be surfaces having a succession of partial surfaces whose reflection coefficient ratios are known. In emission mode, they could be retro-illuminated surfaces whose transmission coefficient ratios are known. With transflexive materials, the same surfaces could be used. The retro-illuminative radiation will preferably be located in the wavelengths located both in the band of sensitivity of the optical sensors of the cameras and in a band having a poor transmission coefficient in air so as to remain stealthy. They could for example be bands located in the near infrared or ultraviolet ranges.

The three distinctive optical reference marks determine the position of distinctive points which themselves determine a plane P containing the axis of the barrel of the weapon or, in certain embodiments, an axis offset in a known way from this axis. The distance between two reference marks, hence two points of the weapon or of the helmet, is known. The result thereof is that, on the basis of the positions of the reference marks of the helmet in the image of the camera of the weapon, and of the reference marks of the weapon of the camera of the helmet, it is possible to compute the aiming direction of the weapon in a reference system related to the helmet and to display this direction by the position of one or more reticules in the visual system of the helmet.

SUMMARY OF THE INVENTION

In short, the invention relates to a device for the localizing and restoring of a line of fire for a weapon carried by a shooter equipped with a helmet, the device comprising two cameras, a first camera and a second camera, each having an objective and at least one sensor sensitive to light radiation, the first camera being mounted on the helmet and the second camera being mounted on the weapon, a computer receiving digitized information from each of the cameras and, on the basis of this digitized information, computing and controlling a display system to bring about the appearance thereon of a symbology providing a real-time depiction of the axis of fire of the weapon, wherein at least three distinctive optical reference marks in the range of sensitivity of the sensor and/or of the sensors are distributed between the weapon and the helmet and wherein, in the firing positions, the reference marks of the helmet are in the fields of the camera of the weapon and the reference marks of the weapon are in the fields of the camera of the helmet.

The word "helmet" as understood in the invention does not designate solely a means of protecting the shooter's head but any device linked rigidly to the shooter's head on which it is possible to rigidly mount a camera, at least one passive and/or active optical reference mark and one visual system.

An optical reference mark is said to be distinctive if it is easily identifiable, for example as a function of its level of brilliance or by a succession on one or two known axes of contrasts. This implies that the coefficients of reflection or transmission of two successive adjacent surfaces contributing to the localization of a distinctive point have a known ratio between them.

The optical reference marks are, for example, distributed at a rate of two on the weapon and one on the helmet or vice versa.

It is also possible to position several distinctive optical references on the helmet and on the weapon.

If the selectivity of the sensors of the cameras is not sufficient, the objectives of the camera may be provided with filters that let through only one narrow band of radiation around the transmission frequency of the active reference marks. The radiation from the active reference marks of the weapon may be different from the radiation from the reference marks of the helmet.

In this case, the filters of the weapon camera and helmet camera will be adapted so that the weapon camera lets through the radiation coming from the reference marks of the helmet and the helmet camera lets through the radiation coming from the reference marks of the weapon. The filters may be interposed intermittently only. They may be mechanical filters or preferably filters resulting from a change in the state of a material, for example contained between two plates, the optical change resulting from a variation of the electromagnetic fields in the material. Possibilities of filtering such as this are known in the prior art. The synchronism of the changes in optical state of the filters and the values of periodicity are controlled by a computer.

In one embodiment, the three distinctive reference points that can be determined on the basis of the three optical reference marks include the optical centers of each camera and another point placed on the weapon. The optical centers of each camera are identified, for example, as being the center of symmetry of the figures of which they are the center of symmetry.

In the preferred embodiment, each of the two cameras is equipped with analog or digital means enabling the localizing, in the optical image, of the distinctive optical reference marks. As a result, the needs of transmission between the computer and the cameras for the localization of the line of fire of the weapon are limited to the requirements for the transmission of these positions. As a result, the links between the cameras and the computer may be wire-type serial links but preferably radio or infrared links that do not require high bit rates.

BRIEF DESCRIPTION OF THE DRAWINGS

The preferred embodiment shall now be described with reference to the appended drawings of which:

FIG. 3a and b exemplifies the making of distinctive reference marks;

FIG. 4 shows a possible way of depicting the line of fire of the weapon in the display system;

In the different figures, the elements having the same function are designated by the same reference number.

MORE DETAILED DESCRIPTION

Figure 1:
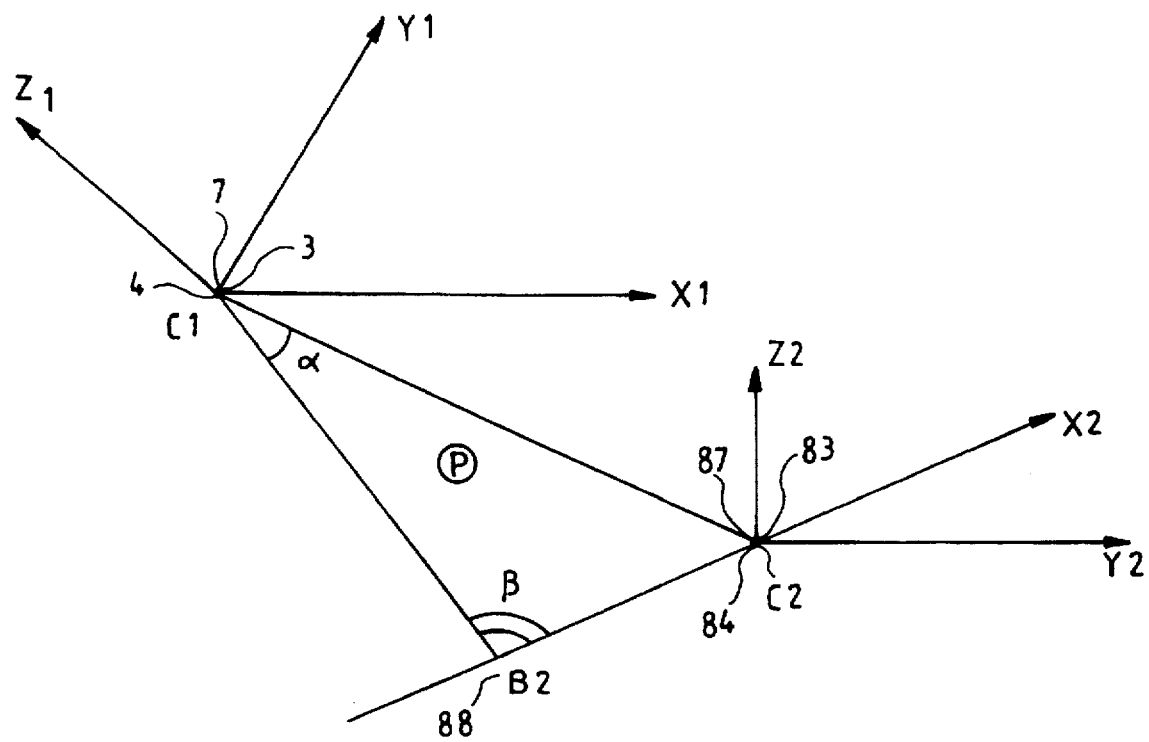
FIG. 1 is designed to illustrate the principle of the reference marking of the axis of the weapon in a reference system related to the camera of the helmet.

FIG. 1 shows the principle of the reference marking of the axis $C_2X_2$ of the barrel of the weapon. FIG. 1 is shown in the preferred embodiment of the invention which shall be described further below, where two of the distinctive points referenced by the optical reference marks are formed by the optical centers $C_1$, $C_2$ of the camera. This is why, in FIG. 1, the center $C_1$ of the camera 3 of the helmet is merged with the distinctive optical reference mark of the helmet 7 and with the objective 4 of the camera. Similarly, the center $C_2$ of the camera 83 of the rifle 80 is merged with one of the distinctive optical reference marks 87 of the rifle and with the objective 84 of the camera 83. The other distinctive point B2 of the rifle corresponds to an optical reference mark 88. It will be noted that each pixel of the optical image corresponds to one direction in space. It is therefore possible to make a definition, for each camera 3, 83 of a reference mark, for example an orthonormal reference mark, $C_1 X_1 Y_1 Z_1$ for the camera 3, $C_2 X_2 Y_2 Z_2$ for the camera 83. For the latter, the axis $C_2 X_2$ is merged with the straight line $C_2 B_2$. The three points $C_1$ $C_2$ $B_2$ enable the same plane P to be identified in each of the reference marks of the camera. The position of the two reference trihedrons is therefore known with respect to the plane P thus enabling their relative orientations to be deduced therefrom. The distance $C_1$ $C_2$ between the two cameras 3, 83 is deduced from the known distance B2 C2 and from the angle $\alpha$ between the straight lines C1 B2 and C1 C2 and $\beta$ of the straight lines B2 C1 and B2 C2 by the formula:

$$\overline{C_1 C_2} = \overline{B_2 C_2} \frac{\sin \beta}{\sin \alpha}$$

Figure 2:
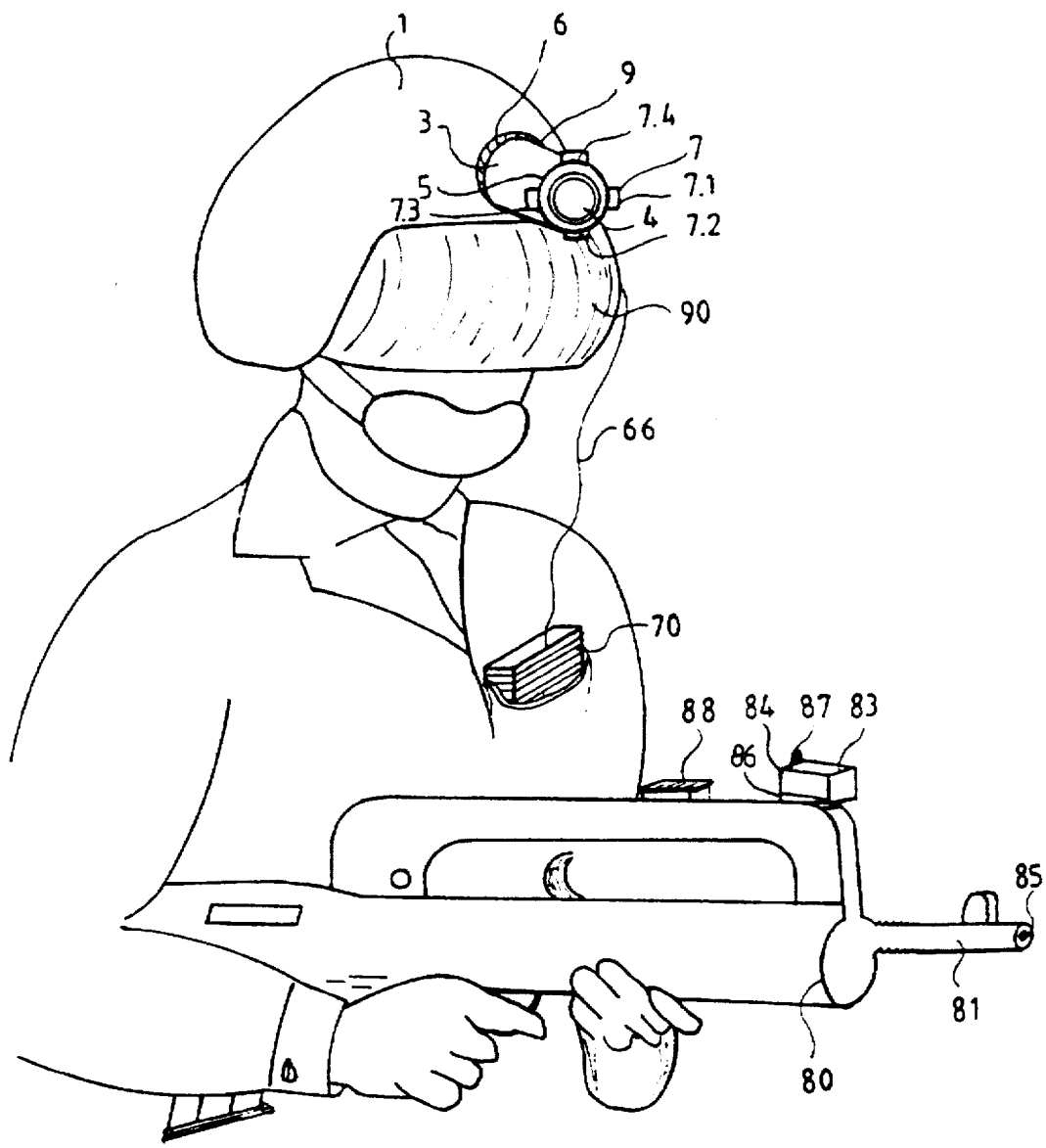
FIG. 2 shows a combatant equipped with a device according to the preferred embodiment of the invention.

The complete system as worn by a shooter is shown in FIG. 2.

This figure shows a combatant equipped with a weapon 80 having a barrel 81. This weapon 80 is fitted out with a camera 83 having an objective 84. The objective 84 of the camera of the weapon 80 is pointed in the direction opposite the mouth 85 of the barrel 81 of the weapon so that when the weapon is in the normal position of shooting without taking aim as shown in FIG. 2 or more generally in a firing position, the fields of the camera include the shooter's head. A support 86 of the camera used as a linking element between the weapon and the camera is used to raise the optical axis of the camera with reference to the axis XX' of the barrel 81.

The modes of making the distinctive optical reference marks 87, 88 and 7 may be very varied.

In the mode shown in FIG. 2, these are sets of distinctive surfaces. These distinctive surfaces have, along two axes, sequences of small surfaces having known contrasts.

The sets of surfaces 7 used to determine the optical center $C_1$ of the helmet camera 3 and 87 to determine the optical center $C_2$ of the camera 83 of the rifle are each formed by four surfaces $7_1$–$7_4$; $87_1$–$87_4$, positioned symmetrically about objectives (4, 84) of each of the cameras. This arrangement is shown more clearly in FIG. 2 about the objective 4 of the helmet camera 3. Each of the four surfaces constituting reference marks 7, 87 are different from one another so that each can be identified and recognized.

Two of these surfaces $7_1$ and $7_2$ have been shown in FIG. 3a and 3b in a cross-sectional view.

They are crosses whose horizontal and vertical arms which have varying widths enable the identification of the detected surface. This identification may be obtained by any types of figures, preferably simple figures, whose reflexivity differs from that of the background of the rectangle or from any other figure forming a contour of each of the surfaces $7_1$ to $7_4$. FIG. 3b shows the same surface areas in a cross-sectional view. The optical qualities of the surfaces result from their constitution along their thickness. From bottom to top, they are constituted by an electroluminescent layer 21 providing for retro-illumination (for use by night) surmounted by materials 22, 23 with different coefficients of transmission.

The shooter wears a helmet 1 which shall now be described. This helmet has a camera 3 identical to the camera 83 of the weapon. It has an objective 4 and a matrix 9 of sensitive elements. This objective is pointed frontward in the shooter's direction of view. It may be fitted out with a filter 5. A support 6 positioned between the helmet 1 and the camera 3 is used to achieve a slight downward tilt of the optical axis of the camera so that, in the normal firing position, the distinctive surfaces 87 and 88 of the weapon 80 are in the field of the camera 3.

A computer 70 carried by the shooter receives information elements from the cameras 3 and 83, computes the direction of the axis XX' of the line of fire and displays it in a visual system 90 worn by the shooter, using a link 66 that has been represented by a line. The links between the camera 3, 83 and the computer 70 were not shown in FIG. 2.

The mode of presentation of the line XX' of fire in the display system 90 shall now be explained with reference to FIG. 4.

In the system that is an object of the invention, the shooter's eye and the axis of aim of the weapon no longer need to be aligned but, as a result of this, the axis of aim cannot be represented simply in the field of vision by a single reticule unless the distance of the targets is predefined for a given reticule (for example at great distance). In general, for a non-predefined distance, it is necessary to represent the axis of aim in space in a to manner similar to that of the localizing of the laser ray in the first known means. Furthermore, the laser ray is stopped by the target aimed at while a virtual axis is not stopped. It is therefore necessary to have an estimation, at short distance (the distance for which the eye/weapon parallax has greater influence on the aiming precision), of the distance at which the target is located on the axis of aim.

One approach recommended in the present invention is to represent a sequence of symmetrical symbolic FIGS. 10, 11, 12 in the display system 90 of the helmet, the centers of symmetry of which are aligned with the axis of aim of the weapon to be represented. The size of each symbolic figure corresponds to the size of an object that is represented by the symbolic figure and is located at a predetermined distance. The symbolic figures are representative shapes and, for example, represent the framing in space of a target having a known size (for example a helmet or a combatant's trunk). The spacing and the number of symbolic figures on the axis of aim depend on the maximum parallax planned, the ballistics of the ammunition and the tolerable difference between the point of aim and the impact. By placing the appropriately sized symbolic figure on the corresponding element of the target, for example the helmet, the shooter thus implicitly estimates the distance and, at the same time, aligns the weapon accurately. Naturally, other means of assessing distance may be used such as a laser telemeter. It is thus possible to obtain a very precise distance but, with the following drawbacks:

an increase in costs;

a lowering of aiming speed and firing speed (a telemetering operation has to be carried out beforehand).

Besides, individual ballistic weapons generally have very flat trajectories, in any case in the zone where the parallax has a significant effect on the aim and the method using symbolic figures has appeared to be sufficient.

It goes without saying that the curvature of the path could be compensated for according to the range of fire by offsetting the axis of aim of the weapon with respect to the axis of firing, namely by implementing a function equivalent to a sighting operation.

Similarly, any aim-disturbing element such as a movement of targets, wind, etc. can be compensated for (once this element is known by appropriate sensors) by a dynamically computed resetting of the depiction of the axis of aim.

The weapon 80 according to FIG. 2 shall now be described with reference to FIG. 5.

Figure 5:
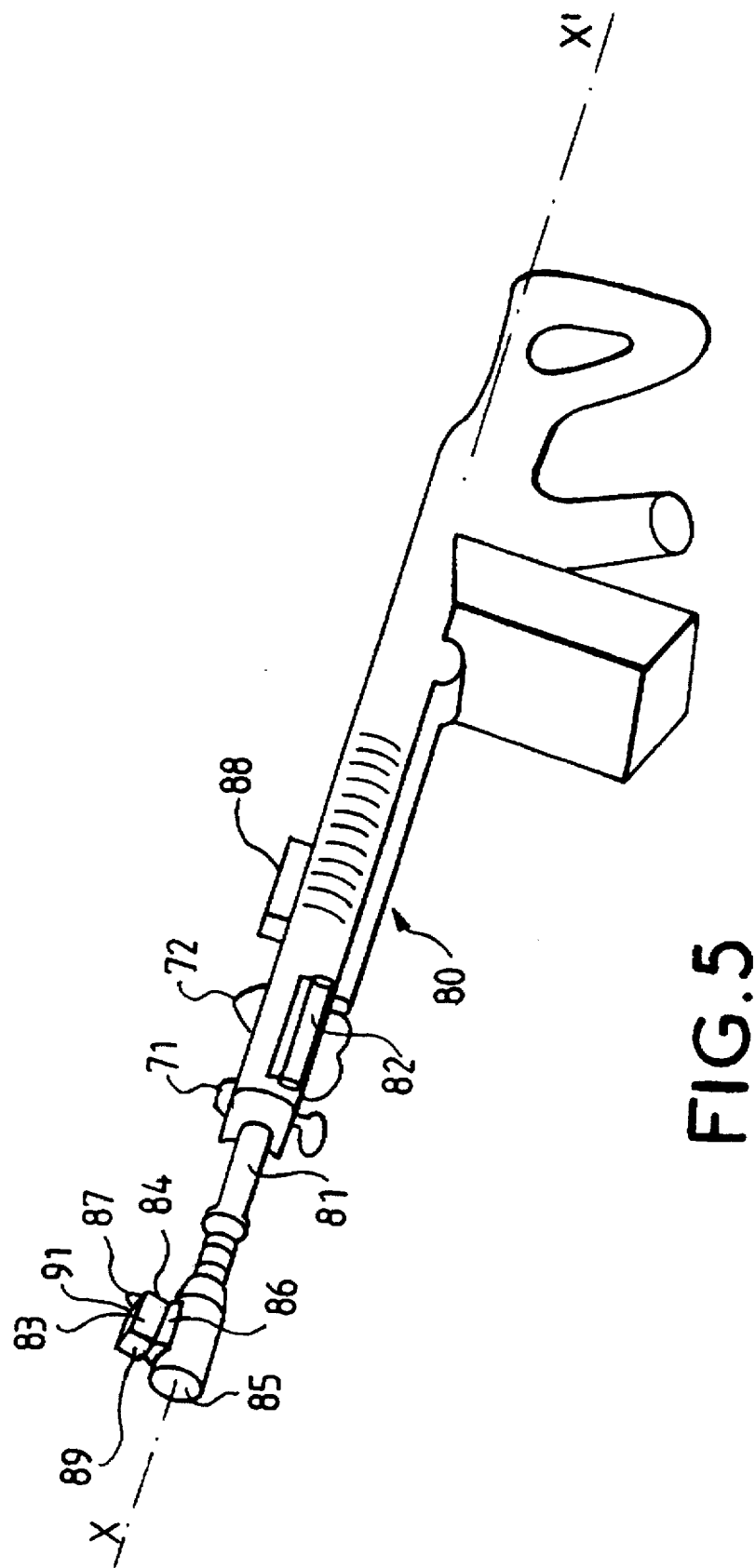
FIG. 5 shows a weapon made according to the preferred embodiment of the invention.

In FIG. 5, all the elements already referenced in FIG. 2 are present. In addition, there is a telemeter 82 designed to measure the distance between the weapon and the target. Links 72, 71 shown in the form of infrared transmitters enable the camera and the telemeter to be linked to the computer 70.

The camera 83 that has been used is, like the camera 3 of the helmet, a SONY (registered mark) miniature camera weighing less than 100 grams. It has a 1024×1024 pixel matrix. It is equipped with a filter 91 selecting the radiation emitted by the source 7 of the helmet. Naturally, the cameras of the helmet and weapon could be different from each other.

Figure 6:
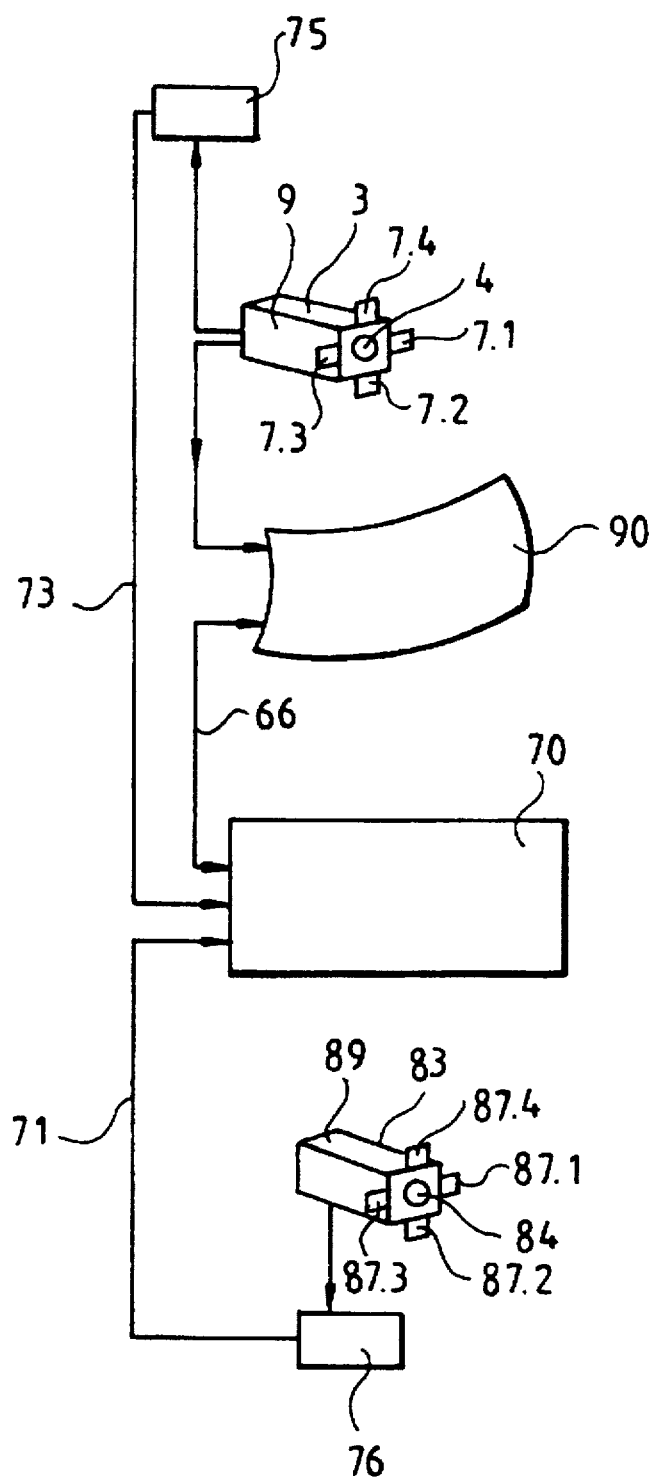
FIG. 6 shows a diagram of operation of the different means forming part of the device according to the invention.

The working of the aiming device shall be explained here below with reference to FIG. 6 which reveals the functional links among the various elements that form part of the preferred embodiment of the invention. Each of the cameras 3, 83 of the helmet and the weapon is linked to an image processing means 75, 76 respectively. In the case of the embodiment shown, it is a dedicated digital and logic processor identifying the distinctive surfaces on the basis of data on the image pixels of each camera in order to extract therefrom the position of the points $C_2$, $B_2$ and $C_1$ respectively. This position is transmitted in real time by links 71, 73 to the computer 70 which computes the position, in relation to the helmet reference mark, of the axis XX' of the weapon. This axis is then displayed in the helmet display system 90 by a link 66.

There is obtained, on the whole, a system that requires only transfers at low bit rates (about 500bits per second per reference position transmitted for a camera working at 25 images per second). The processing for the preparation of the relative position and computation of the orientation of the axis of aim is simple enough to be done by programming and is done at a sufficient rate on a non-specialized microprocessor.

The device for the relative localizing of two reference trihedrons by cameras that face each other and observe reference marks co-aligned with the axis of each camera enables computations of localization that are particularly simple and above all particularly adapted to precise localizing for aiming systems.

It can indeed be shown that the precision of the angle formed by the two axes (aiming camera and axis of aim of the weapon) is extracted with precision in the range of that of the angle measured on a distinctive reference mark by a camera, i.e. approximately the ratio of the angle of aperture of the camera to the minimum angle of separation of the camera.

In view of the technologies available, an angular precision of about 1 milliradian may be obtained while at the same time keeping a field angle (approximately 1 radian) sufficient for the general operation of the system.

The low bit rate needed makes it possible for example (without its being obligatory) to have wireless communication at very low cost between the weapon and the computer and/or the helmet.

What is claimed is:

1. A device for the localizing and restoring of a line of fire of a weapon carried by a shooter equipped with a helmet, the device comprising two cameras, a first camera and a second camera, each having an objective and at least one sensor sensitive to light radiation, the first camera being mounted on the helmet and the second camera being mounted on the weapon, a computer receiving digitized information from each of the cameras and, on the basis of this digitized information, computing and controlling a display system to bring about the appearance thereon of a symbology providing a real-time depiction of the axis of fire of the weapon, wherein at least three distinctive optical reference marks in the range of sensitivity of the at least one sensor are distributed between the weapon and the helmet and wherein, in the firing positions, the reference marks of the helmet are in the fields of the camera of the weapon and the reference marks of the weapon are in the fields of the camera of the helmet.

2. A device according to claim 1, wherein the distinctive reference marks are passive catadiopters.

3. A device according to claim 2, wherein the distinctive reference marks are constituted by an electroluminescent screen covered with a layer of transflexive materials.

4. A device according to claim 3, wherein certain of the distinctive reference marks are positioned about the objective of one camera or the other.

5. A device according to claim 4, wherein each of the cameras has an image-processing means enabling the extraction of the position, in the image, of the distinctive reference marks.

6. A device according to claim 3, wherein each of the cameras has an image-processing means enabling the extraction of the position, in the image, of the distinctive reference marks.

7. A device according to claim 2, wherein certain of the distinctive reference marks are positioned about the objective of one camera or the other.

8. A device according to claim 7, wherein each of the cameras has an image-processing means enabling the extraction of the position, in the image, of the distinctive reference marks.

9. A device according to claim 2, wherein each of the cameras has an image-processing means enabling the extraction of the position, in the image, of the distinctive reference marks.

10. A device according to claim 1, wherein the distinctive reference marks are active.

11. A device according to claim 10, wherein certain of the distinctive reference marks are positioned about the objective of one camera or the other.

12. A device according to claim 11, wherein each of the cameras has an image-processing means enabling the extraction of the position, in the image, of the distinctive reference marks.

13. A device according to claim 10, wherein each of the cameras has an image-processing means enabling the extraction of the position, in the image, of the distinctive reference marks.

14. A device according to FIG. 1, wherein the reference marks are constituted by juxtaposed surfaces, two adjacent surfaces having coefficients of reflection of different values with respect to each other.

15. A device according to claim 14, wherein certain of the distinctive reference marks are positioned about the objective of one camera or the other.

16. A device according to claim 15, wherein each of the cameras has an image-processing means enabling the extraction of the position, in the image, of the distinctive reference marks.

17. A device according to claim 14, wherein each of the cameras has an image-processing means enabling the extraction of the position, in the image, of the distinctive reference marks.

18. A device according to claim 1, wherein certain of the distinctive reference marks are positioned about the objective of one camera or the other.

19. A device according to claim 18, wherein each of the cameras has an image-processing means enabling the extraction of the position, in the image, of the distinctive reference marks.

20. A device according to claim 1, wherein the objectives of the cameras are provided with light filters.

21. A device according to claim 20, wherein each of the cameras has an image-processing means enabling the extraction of the position, in the image, of the distinctive reference marks.

22. A device according to claim 1, wherein the weapon is provided with two distinctive reference marks.

23. A device according to claim 22, wherein each of the cameras has an image-processing means enabling the extraction of the position, in the image, of the distinctive reference marks.

24. A device according to claim 1, wherein each of the cameras has an image-processing means enabling the extraction of the position, in the image, of the distinctive reference marks.

* * * * *